United States Patent [19]

MacCracken

[11] Patent Number: 4,466,256
[45] Date of Patent: Aug. 21, 1984

[54] GROUND-INSTALLED COLDNESS STORAGE AND UTILIZATION SYSTEM

[76] Inventor: Calvin D. MacCracken, c/o Calmac Manufacturing Corporation, Englewood, N.J. 07631

[21] Appl. No.: 377,667

[22] Filed: May 12, 1982

[51] Int. Cl.³ .............................................. F25D 23/12
[52] U.S. Cl. ........................................ 62/260; 165/45; 126/400
[58] Field of Search ................... 62/260, 324.1, 238.6; 165/45; 126/400

[56] References Cited

U.S. PATENT DOCUMENTS

| | | | |
|---|---|---|---|
| 2,722,107 | 11/1955 | Gay | 62/260 |
| 4,011,736 | 3/1977 | Harrison | 62/260 |
| 4,346,569 | 8/1982 | Yuan | 62/260 |

Primary Examiner—Albert J. Makay
Assistant Examiner—Henry Bennett
Attorney, Agent, or Firm—Charles J. Brown

[57] ABSTRACT

A ground-installed coolness storage and utilization system wherein a given volume of water-soaked soil is frozen by passing an air-chilled heat-exchange liquid through tubes buried in the soil, and thereafter on demand the heat-exchange liquid is conveyed out of the tubes buried in the frozen soil to cool a warmer medium such as ambient air in a building.

4 Claims, 2 Drawing Figures

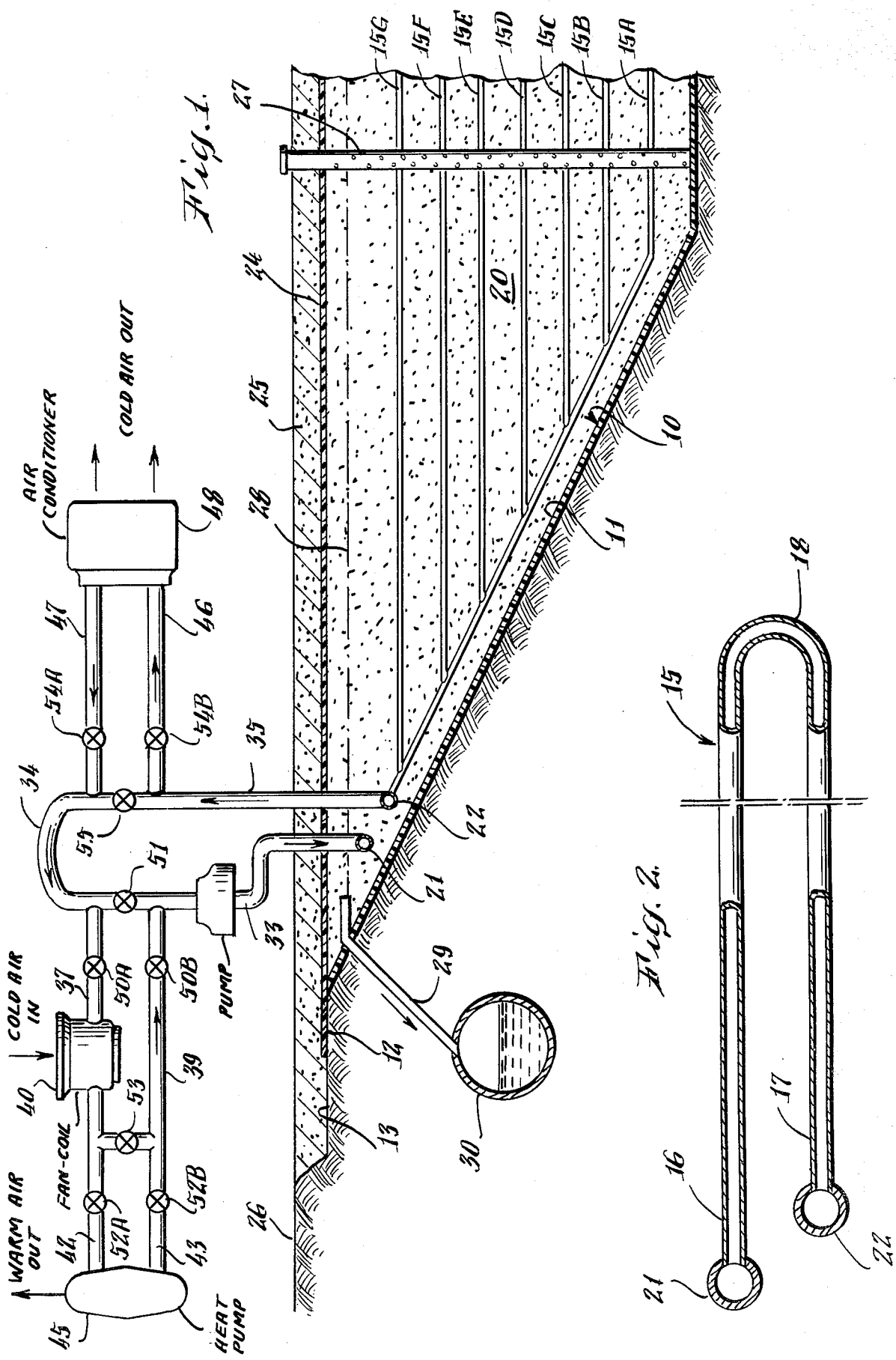

GROUND-INSTALLED COLDNESS STORAGE AND UTILIZATION SYSTEM

BACKGROUND OF THE INVENTION

There is a long and well-known history to the art of storing the cold of winter so that it can be used for purposes of cooling in summer, starting perhaps with the nineteenth century practice of storing blocks of natural winter ice in sawdust and distributing them in the summer for cold storage of food. The same concept was then applied at least experimentally to the use of natural ice blocks for cooling and dehumidifying ambient air in buildings. More recently it has been proposed to form what are known as "ice ponds" by filling excavated pits with artificial snow in the wintertime, using snow-making equipment familiar to the ski industry, and thermally insulating the deposits of snow. In the summer the melt water from the snow deposits is pumped to the chilled water system of a nearby building when air conditioning is needed and the return water is sprayed back over the snow for recooling. Known variations of this concept include the use of artifically manufactured ice which is shucked into bins or frozen in tanks in place of man-made snow in pits.

My U.S. Pat. Nos. 3,751,935, 3,893,507 and 3,636,725 also constitute part of the background of this invention. They concern the making of ice rinks by the use of a multiplicity of plastic tubes embedded in a matrix and connected to inlet and outlet headers. A chilled heat-exchange liquid is passed through the tubes to freeze overlaying water to form a rink. In U.S. Pat. No. 3,910,059 also issued to me another array of similar tubes is buried in underlayment beneath the cooling tubes and a lightly heated antifreeze solution is circulated through them to prevent frost buildup and heaving in the ground beneath the rink.

Out of all of this prior art the present invention proposes an inexpensive and efficient coldness storage and utilization system which reduces summer air conditioning costs by using only natural winter cold or at least the coolness of winter air supplemented by low cost mechanical refrigeration. An installation according to the invention is virtually entirely underground and does not preclude other uses of the ground surface above it. Heaving is prevented in spite of the fact that a very large mass of frozen water-soaked soil is employed having a high latent heat of fusion.

STATEMENT OF THE INVENTION

The invention provides a ground-installed coolness storage and utilization system comprising an excavated pit with a liquid-impermeable membrane lining the pit. Water-permeable soil is backfilled within the pit. A multiplicity of tube means are buried at various levels within the soil each defining an extended closed loop from an inlet to an outlet end thereof. Inlet and outlet headers are connected respectively to the inlet and outlet ends of each of the tube means. A heat-exchange liquid with a freezing temperature below 0° C. fills the headers and tube means.

Water permeates the soil and is contained by the membrane to a level above the tube means. Cooling means are provided for chilling the heat-exchange liquid to below 0° C. Pump means are included for circulating the chilled heat-exchange liquid through the headers and tube means to freeze the water-permeated soil and thereafter for conveying the liquid on demand from the tube means buried within the frozen soil into heat-exchange relation with a medium substantially warmer than 0° C. so as to cool the medium.

The invention also provides a method of storing and utilizing coldness in the ground which comprises the steps of first burying within a given volume of water-permeable soil a multiplicity of tube means connected to headers and forming a closed heat-exchange flow path. Water is then permeated throughout the soil to a level above the tube means. The tube means and headers are then filled with a heat-exchange liquid having a freezing temperature below 0° C. The heat-exchange liquid is then chilled to below 0° C. but above its freezing temperature. The chilled heat-exchange liquid is then pumped to circulate throughout the flow path defined by the tube means and headers to freeze the water-permeated soil. Thereafter the liquid is conveyed on demand from the tube means buried within the frozen soil into heat-exchange relation with a medium substantially warmer than 0° C. so as to cool the medium.

BRIEF DESCRIPTION OF DRAWINGS

FIG. 1 is a section of a ground-installed coolness storage system according to the invention partly diagramatic and partly structural in form; and FIG. 2 is an enlarged detail partly broken away showing the headers and one interconnecting tube.

DESCRIPTION OF PREFERRED EMBODIMENT

As shown in FIG. 1 a pit 10 is bulldozed in the ground to a depth of perhaps twelve to fifteen feet and it is configured with a flat bottom and sloping sides for easy access with excavating machinery. A typical slope may be one foot vertically for every two feet horizontally. The shape in plan of the pit 10 may assume various forms but a preferred configuration might be rectangular with sloping sides of the pit all around. The entire bottom and sides of the pit 10 are covered by a liquid-impermeable membrane 11 which may be of plastic or rubber similar to pool and reservoir liners. The upper periphery 12 of the membrane overlies a peripheral shelf 13 of the pit 10.

Referring now to both FIGS. 1 and 2 a plurality of flexible tubes 15 are laid in the pit in horizontal layers 15A to 15G, the precise number of which is a function of the desired capacity and size of the installation. Each of the tubes 15 is a continuous flexible tube having inlet and outlet ends 16 and 17 respectively and a U-bend 18 remote from those inlet and outlet ends. More complex tubular extrusions may also be used such as dual tubes extruded in contact side-by-side or even webbed extrusion of a plurality of tubes. The layers of tubes 15A to 15G are separated by and buried within backfilled water-permeable soil 20 which fills the pit 10 up to the level of its peripheral shelf 13.

The inlet and outlet ends 16 and 17 of each of the tubes 15 are connected respectively to inlet and outlet rigid tubular headers 21 and 22. The headers 21 and 22 might typically be two inches in inside diameter whereas the tubes 15 may be from one eighth to one inch in inside diameter, and the spacing between the layers 15A to 15G may be one-half to two feet. All of these dimensions may be varied depending upon the size and capacity of the particular installation.

The headers 21 and 22 are shown only in section because their longitudinal configuration is not critical. However, it is contemplated that the headers may be only perhaps three to eight feet in length and therefore their interconnections with each of the closed-loop tubes 15 will be closely spaced in a line along the length of each header. The tubes 15 may fan out from the pair of headers in many directions so that they are equally spaced horizontally in each of the layers 15A to 15G. The object is to provide uniformly spaced positioning of the multiplicity of tubes throughout the matrix of the soil 20.

As seen in FIG. 1 the headers 21 and 22 are buried and therefore thermally insulated within the backfilled soil near the top of the pit at one edge thereof. The upper surface of the backfilled soil 20 is covered by a layer of waterproof insulation 24 which may be 2'×8'×1" sheets of rigid foam laid in a double layer with overlapping seams and covered by a waterproof barrier formed of plastic or rubber sheets, as previously used under ice rinks. Perhaps a foot of covering soil 25 is laid over the insulation 24 and leveled and rolled to the ground level 26.

Extending downwardly through the covering soil 25 and the insulation 24 is a porous fillpipe 27 such as "Orangeburg" pipe. The fillpipe 27 extends completely to the bottom of the backfilled soil 20 in the pit 10. There may be more than one such fillpipe 27 again depending upon the size of the installation. Water is introduced through the fillpipe 27 so that it soaks the soil 20 and rises to a level indicated by the dot-dash line 28 near the top of the pit above the level of the headers 21 and 22 and all of the tubes 15. An overflow runoff 29 is provided at one edge of the pit leading to some form of drain 30 so that the high water level 28 is not exceeded. In the subsequent freezing of the water-permeated soil runoff prevents heaving and thus allows the upper surface of the covering soil 25 to be used for other purposes such as a parking lot. White gravel would be particularly suitable for a surfacing material because it would reflect more solar heat during the daytime and would emit radiant heat at night.

The inlet and outlet headers 21 and 22 are interconnected by piping and other apparatus which is shown schematically in FIG. 1. In essence this apparatus consists of a primary loop made up of first, second and third primary pipe sections 33, 34 and 35. A circulating pump 36 is disposed within this primary loop. A secondary pipe loop extends from the primary pipe loop and comprises secondary pipe sections 37, 38 and 39. A fan-coil 40 is included in this secondary loop for receiving ambient cold air and blowing it over a conventional coil. A supplementary loop extends from the secondary loop and includes supplementary piping 42 and 43. A powered liquid source heat pump 45 is included in this supplemental loop and consists of the usual evaporator, condenser and compressor from which air warmer than ambient is expelled during operation. A tertiary loop also extends from the primary loop and includes tertiary piping 46 and 47 and an ambient air cooling and dehumidifying coil 48 (i.e., a liquid air conditioning coil) is included in this tertiary loop from which cold air is ejected.

The valving for controlling these various loops is as follows: Valves 50A and 50B can be closed to isolate the secondary and supplemental loops which include the fan-coil 40 and the heat pump 45, and in that case a valve 51 is opened. When the valves 50A and 50B are opened and the value 51 is closed the secondary loop is in communication with the primary loop. If valves 52A and 52B are closed while valve 53 is opened the heat pump 45 is isolated from the fan-coil 40, and conversely when the valves 52A and 52B are opened and the valve 53 is closed the heat pump 45 and the fan-coil 40 operate in series with one another. Valves 54A and 54B may be closed with a valve 55 opened to isolate the tertiary loop from the primary loop so that the air conditioning coil 48 is not operated. Conversely when the valves 54A and 54B are opened and the valve 55 is closed the air conditioning coil 48 is in series with the remainder of the primary loop.

This closed recirculating system is filled with an antifreeze liquid mixture such as forty percent ethylene glycol and sixty percent water by volume which has a freezing point of about −26° C. Care is to be taken that no air remains in the system. With water filled to the level 28 in the soil 20 the system is ready for operation.

The operation is in several modes: The first mode is that of freezing the water-soaked soil 20 in the pit by relying solely on the sub-freezing temperature of outside winter air. In this first mode the valves 54A and 54B are closed and the valve 55 is opened so that the air conditioning coil 48 is not in use. The valves 50A and 50B are opened and the valve 51 is closed so that the secondary loop is in operation. However, the valves 52A and 52B are closed and the valve 53 is opened so that the supplemental loop and its heat pump 45 are not in use. In the first mode the pump is activated, perhaps automatically, by a thermostat which responds to subfreezing outdoor temperatures, and the heat-exchange liquid is pumped through the inlet manifold 21 and multiplicity of tubes 15. The heat-exchange liquid circulates from the outlet manifold 22 through the primary pipe sections 35 and 34 and then the secondary pipe section 37 and back to the pump 36. Cold outside air drawn into the fan-coil 40 chills the heat-exchange liquid to below the freezing temperature of water so that the water-permeated soil in the pit slowly but steadily freezes. This can be done at times of low electricity demand such as at night so that the entire water-soaked backfilled pit is frozen to the level 28 at the lowest possible cost. As it freezes the expanding water absorbed by the relatively dry soil above the level 28 eliminates heaving of the surface covering 25.

In the second mode of operation the valving is set exactly as in the first mode except that valves 52A and 52B are opened and the valve 53 is closed so that the heat pump 45 is in series with the fan-coil 40. This mode is particularly useful for more moderate climates where winter temperature does not become sufficiently low for sufficiently protracted periods of time to permit chilling of the heat-exchange liquid to below 0° C. solely by ambient air. The second mode contemplates the use of the heat pump 45 to supplement the fan-coil 40. The warm air expelled from the condenser of the heat pump 45 may be used for heating the interior of a building. Again, the heat pump 45 is operated during times of low electricity intending to minimize the energy cost entailed in freezing the water-soaked soil 20 in the pit.

In the third mode of operation the coolness stored in the pit is recaptured and utilized. Therefore, the valves 50A and 50B are closed and the valve 51 is open so that the fan-coil 40 and heat pump 45 are isolated and not in use. The valves 54A and 54B are open and the valve 55 is closed so that the heat-exchange liquid in the system is pumped through the tertiary loop and its pipe sections 46 and 47 through the air conditioning coil 48. Cold air is expelled from the air conditioning coil for cooling the interior of the building. As this use proceeds during summer months the frozen water-soaked soil 20 in the pit 10 slowly thaws. If the capacity and output of the overall system are properly determined the coolness storage of the system will not be exhausted during the summer air conditioning season; but if it is anticipated that the coolness storage will otherwise be exhausted a certain amount of additional freezing of the soil 20 to insure full air conditioning use can be achieved by operating the heat pump 45 independently of the fan-coil 40. In all instances of operation the electricity demand is off the daytime electric peak load and indeed off the seasonal peak as well so that a minimal demand is placed upon the electrical utilities. This high efficiency of operation means that only a fraction of the electricity for a given air conditioning output on hot summer days will be consumed in comparison to conventional electric-powered air conditioning systems.

The entire system may be made automatic by various thermostat controls including the one already mentioned which senses the outside air temperature to activate the pump 36. Another is a thermostat which senses the temperature of the heat-exchange liquid coming out of the pit in the primary tube section 35. When the water-soaked soil 20 is being frozen the return temperature at that point will be very close to 0° C. and will remain at that level for a protracted period. When this return temperature in the primary pipe section 35 begins to go down more rapidly it indicates that the water-soaked soil 20 is completely frozen and a thermostat sensing that temperature drop may be set to turn off the pump 36 and the fan-coil 40. To allow for more accurate monitoring of the freezing process the pit may be constructed in sections each frozen in turn or a sequence of separate pits may be frozen one after the other. The building air conditioning coil 48 may also be controlled by a thermostat together with the appropriate valves to activate the pump 36 and the air conditioning coil 48 when an output of cooled air is required.

A particular feature of the invention is the self-insulating effect of the melting water which inevitably occurs after initial freezing. The frozen water-soaked mass becomes enveloped by a layer of stationary melt-water in soil and since water has a much lower thermal conductivity coefficient than ice the effect is to insulate the frozen mass from rapid thawing.

It is to be emphasized that this system and its various modes of utilization are described schematically only to illustrate the concept involved. The piping in the various loops and its associated valving, and indeed the thermostat systems which are not shown, may all be refined and modified to various degrees known to the heat-exchange industry. The scope of the invention is therefore to be taken from the following claims rather than from this illustrative embodiment.

I claim:

1. A method of storing and utilizing coolness in the ground wherein a pit is excavated and lined with a liquid-impermeable membrane and back-filled with water-permeable soil in which is buried tube means providing a heat-exchange flow path, said method comprising:
    (a) permeating the back-filled soil with water to a level above the tube means and below upper ground surface,
    (b) freezing the water-permeated back-filled soil into a frozen ground matrix around the tube means by pumping a sub-zero degrees centigrade heat exchange liquid through the tube means,
    (c) thermally insulating the upper surface of the back-filled soil above said water level to allow for expansion as the frozen-ground matrix forms without disturbing the upper soil surface and to reduce heat transfer into the frozen matrix, and
    (d) thereafter pumping said heat-exchange liquid on demand from the tube means buried within the frozen matrix into heat-exchange relation with a medium substantially warmer than sub-zero degrees centigrade so as to cool said medium.

2. A method according to claim 1 wherein the heat-exchange liquid is chilled by ambient air to a temperature below sub-zero degrees centigrade.

3. A method according to claim 1 wherein the heat-exchange liquid is chilled at least in part by a powered liquid source heat pump.

4. A method according to claim 1 wherein said water level is established by running off excess water.

* * * * *